April 29, 1969     R. H. DE GASTON     3,441,264
WORK HOLDING APPARATUS
Filed Nov. 22, 1966
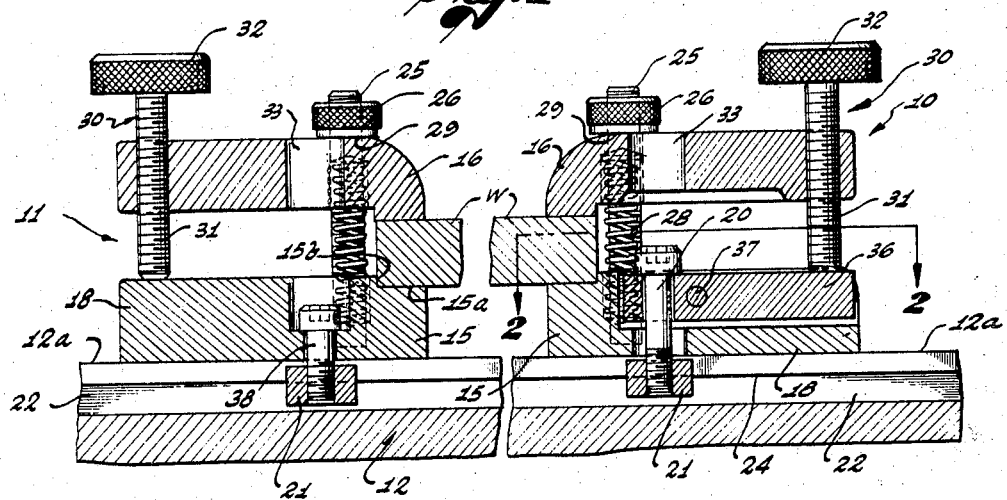
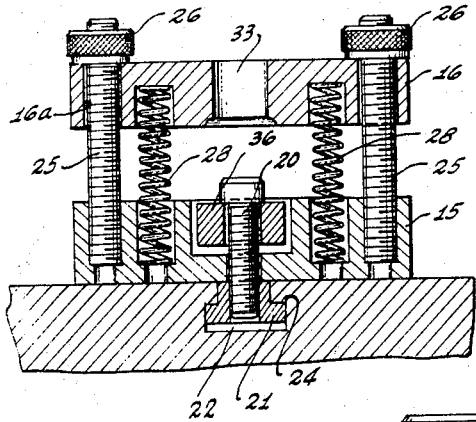
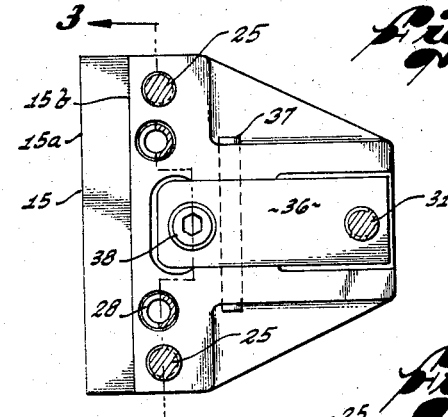
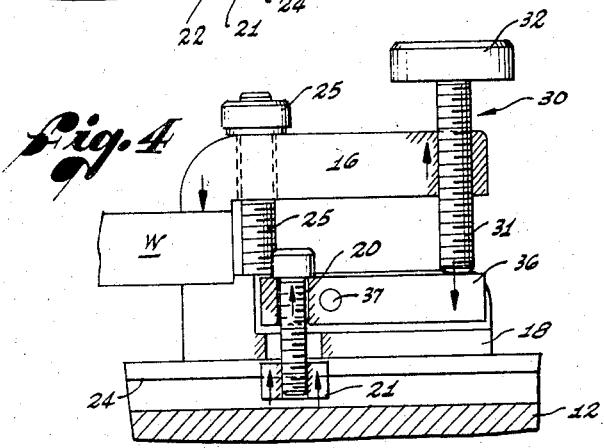
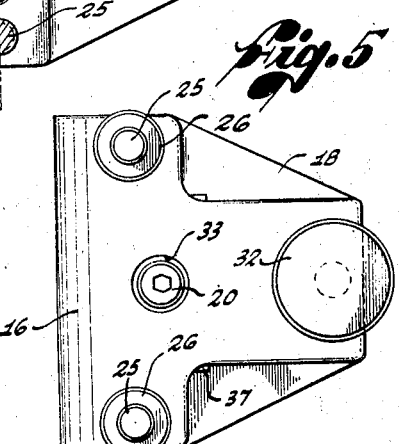
INVENTOR.
RAOUL H. de GASTON
BY Forrest J. Lilly
ATTORNEY

United States Patent Office 3,441,264
Patented Apr. 29, 1969

3,441,264
WORK HOLDING APPARATUS
Raoul H. de Gaston, 1332 W. Florence Ave.,
Los Angeles, Calif. 90044
Filed Nov. 22, 1966, Ser. No. 596,240
Int. Cl. B25b 1/00, 1/02; B23q 3/02
U.S. Cl. 269—89                                         4 Claims

ABSTRACT OF THE DISCLOSURE

A vise is designed to be mounted in multiple units, typically in pairs, on top of a horizontal table of a machine tool or the like. The vise has a novel arrangement in which a hand-operated screw simultaneously clamps the workpiece to the vise and secures the vise to the table, or simultaneously releases the work and the vise from the table. Thus, only one vise of two or three units needs to be released in order to replace a workpiece with a new blank, eliminating much of the time involved in repeated setups for production jobs.

---

The present invention relates generally to devices for holding a workpiece during machining or other operations on the workpiece, and more especially to apparatus for gripping the workpiece at several positions around the periphery of the workpiece when it is of substantial extent parallel to the surface of a work table.

When the piece which is being worked on is of relatively large extent, it is often necessary to engage the workpiece as several positions in order to hold it firmly and to orient it with respect to the tools which are performing the work. A typical example is holding a large piece of work on the horizontal table of a milling machine. If the clamping elements are such as to produce substantial tension or compression across the workpiece, this can be reflected in reaction forces in the table with the result that either the table or the workpiece, or both, are subject to substantial deflection that creates inaccuracies in the work done. This is especially true if the workpiece is comparatively thin in a transverse direction, giving it plate-like characteristics. However, without this being true of the workpiece, it is still very often the case that when the work is clamped firmly, the strains in the table are of sufficiently large magnitude to prevent highly accurate machine work from being performed.

Thus, it becomes a primary object of the present invention to provide a work holding system or apparatus which is designed to engage a large workpiece at several positions to hold the work firmly and accurately in position but without inducing strains in either the work or the table which prevent highly accurate machining.

Another object of the present invention is to provide work holding apparatus comprising one or more clamping means which operate to position the work accurately, other clamping means cooperating therewith being movable with respect to the table or base upon which the work is mounted so that successive workpieces can be accurately located and firmly held on the table.

A further object of the present invention is to provide work holding apparatus which can be quickly and easily operated manually, without the need of wrenches or other similar tools, to hold the work and secure the clamping means in place on the base to which the workpiece is attached.

These and other objects of the present invention are achieved by providing work holding apparatus for mounting on a base in order to hold thereon a workpiece comprising a plurality of work holding clamps, each having a pair of jaws relatively movable in a direction perpendicular to the base in order to engage and hold a workpiece which extends generally parallel to the base. One of the work holding clamps may be provided with any means for securing it in a fixed selected position in order to locate the workpiece in a predetermined position.

Another one of the work holding clamps is provided with releasable means for securing the clamp to the base in a position which is determined by the workpiece itself, the releasable means being manually operable to secure the clamp in position or to be released, thereby freeing the last-mentioned clamp for limited movement of the clamp relative to the base. This movement preferably permits the clamp to be moved linearly over the base as well as to be rotated about an axis which is perpendicular to the surface of the base.

The work holding clamps may be of novel design, each comprising a pair of jaws, one of which is movable to rock about a fulcrum toward and away from the fixed jaw in order to hold a workpiece between the two jaws. A lever is pivotally mounted on the fixed jaw and an operating member is connected to the movable jaw and engages the lever to move both the jaw and the lever simultaneously to clamp a workpiece between the jaws and to secure the work holding clamp to the base by tightening securing means which is coupled to the lever and to the base.

How the above objects and advantages of the present invention, as well as others not specifically mentioned, are attained will be more readily understood by reference to the following description and to the accompanying drawing, in which:

FIGURE 1 is a vertical median section through two work holding clamps and a portion of the base or work table on which they are mounted;

FIGURE 2 is a horizontal section on line 2—2 of FIGURE 1;

FIGURE 3 is a vertical section on line 3—3 of FIGURE 2;

FIGURE 4 is a diagrammatic view of the work holding clamp illustrated in FIGURES 2 and 3;

FIGURE 5 is a top plan view of the righthand clamp of FIGURE 1.

Referring now to the drawing, and more particularly to FIGURE 1, it will be seen that the work holding apparatus of the present invention comprises a pair (or more) of work holding clamps each indicated generally at 10 and 11. These two clamps are mounted upon a base 12 which may typically be the table of a milling machine or other machine tool, although the invention is not necessarily limited to any specific base. Instead, the base upon which the clamps 10 and 11 are mounted may be a movable base, such as the face plate on a lathe.

Considering first the clamping means 10, this will be seen to comprise a fixed jaw 15 and a movable jaw 16 between which the workpiece W is held, as indicated in FIGURE 1. Workpiece W typically extends for some distance generally parallel to the surface 12a of base 12, surface 12a being typically horizontal as shown. Fixed jaw 15 is integral with base plate 18 and is secured to base 12 in any suitable manner. Typically and preferably, this is accomplished by means of anchor means such as machine screw 20 on which is threaded a T-nut 21 that slides in a T-shaped slot 22 in base 12. As may be seen in FIGURE 3, nut 21 has a pair of upwardly facing shoulders which engage downwardly facing shoulders 24 of the T-slot; and when machine screw 20 draws nut 21 up against shoulders 24, the clamp is drawn downwardly against the top surface 12a of base 12 and is secured in any selected position, as will be explained.

The fixed jaw and base plate has mounted on it a pair of threaded posts 25 which are parallel to each other and extend upwardly away from the combined jaw and base plate. The movable jaw 16 has a pair of spaced openings 16a. The post 25 extends through each one of these openings which are large enough to provide adequate clearance around the post that the jaw can move freely along the post and also rock slightly relative to the post for reasons which will become more apparent. Movement of the movable jaw along the two posts 25 accommodates larger or smaller workpieces W. On the upper end of each post 25 is a knurled thumb nut 26 which can be screwed up or down on the post in order to regulate the spacing between the two jaws 15 and 16 for this purpose. A pair of coil springs 28 are preferably interposed between the fixed and movable jaws. The ends of the springs rest in sockets in the two jaws, as shown particularly in FIGURE 3, and resiliently support the weight of the movable jaw. These springs make it easier to insert work between the two jaws, and they are compressed by movement of nuts 26 downwardly on posts 25.

The two nuts 26 bear against the upper surface of the movable jaw, as shown in FIGURE 3, and thereby establish a transversely extending fulcrum which extends in a vertical plane about this fulcrum, i.e., generally perpendicular to surface 12a, in order to grip or release a workpiece W held between the two jaws. For this reason also, it is preferable that the openings 16a in the movable jaw have appreciable clearance with posts 25, as mentioned above.

Clamp 10 is provided with means for operating the movable jaw and also simultaneously securing the clamp to the base. This means comprises the hand screw 30 which has a threaded shank 31 that is received in a threaded bore in movable jaw 16 and terminates at its upper end in knob 32 by which the hand screw may be turned manually. Hand screw 30 is located at the end of the movable jaw away from the work engaging surface, whereby fulcrum 29 is located between the work engaging end of the jaw and hand screw 30.

The lower end of threaded shank 31 bears against lever 36 which is pivotally mounted to rock with respect to fixed jaw 15, by means of pivot pin 37 which is mounted at its ends at either side of lever 36, in the combined fixed jaw and base. Hand screw 31 bears against the rear end of lever 36, that is the righthand end when viewed in FIGURE 1, or the end opposite to that which is engaged by anchor means 20. Screw 20 passes through a bore in the lever at the forward end, that is the lefthand end viewed in FIGURE 1, so that the pivot pin is between the screw 20 and shank 31. Access to screw 20 in order to screw it into nut 21 is had through an opening 33 in movable jaw 16, which admits a wrench to the upper end of screw 20.

These parts are shown diagrammatically in FIGURE 4 wherein it will be seen by reference to the arrows in the figure that when the hand screw 30 is rotated in a direction to move it downwardly with respect to movable jaw 16, it depresses the rear end of lever 36, thereby rocking the lever to raise the forward end and lift anchor screw 20 and T-nut 21 thereon into clamping engagement with shoulders 24 on the base 12. At the same time, the rear end of movable jaw 16 is raised upwardly, rocking the jaw about fulcrum 29 and depressing the forward end to bring it into gripping engagement with the workpiece W.

All of these motions take place simultaneously so that a single operation of hand screw 30 causes jaw 16 and lever 36 to rock about their respective axes at the same time. The direction of movement of these two elements is such that the two ends of the members adjacent hand screw 30 are moved apart to simultaneously grip the work and the table 12; or they are moved together to release the work and release the clamp from the table on which it is mounted.

When anchor screw 20 is released by turning knob 32, work holding clamp 10 is movable over the surface of base 12. It is free to move not only linearly along the length of T-slot 22 but also to rotate about the vertical axis, that is, an axis perpendicular to surface 12a, established by anchor bolt 20. These two movements allow the clamp to be moved into position against the workpiece. Assuming that the workpiece is already engaged by the clamp 11, then the clamp 10, being more easily disposed with relation to the workpiece, is moved to a position determined by the location of the workpiece in order to grip the workpiece.

Work holding clamp 11 is constructed the same as clamp 10, except that it is simplified somewhat by the elimination of lever 36. When lever 36 is omitted, the end of shank 31 bears directly against the upper surface of the combined jaw and base plate 15. The means for securing the clamp in place on base 12 then takes the form of a shortened anchor screw 38 which passes through an opening in the fixed jaw and engages the fixed jaw directly. On the threaded end of the screw 38 is a T-nut 21 which engages shoulders 24 in T-slot 22 in the manner already described.

The simplified form of work holding clamp 11 is used in cooperation with the one previously described since when repeated operations are performed on similarly shaped workpieces, one clamp 11 may be secured to the table or base 12 and left in position. A new workpiece is then positioned with respect to the machine tool by means of the angularly related surfaces 15a and 15b on fixed jaw 12 of clamp 11. After the workpiece is positioned by reference to these two surfaces and gripped by the clamp 11, then the other clamp 10 is moved into engagement with the workpiece. The clamp is then secured to base 12 and it also grips the workpiece by the simultaneous action of jaw 16 and lever 36 produced by rotating hand screw 30.

It will be noted that the movable jaw 16 of both clamps 10 and 11 moves in a direction substantially perpendicular to the base 12 on which the clamps are mounted. As a consequence, the jaws engage the workpiece without transmitting any stress to base 12. Any loads imposed on the table are perpendicular to the base 12 and no strains in the table are generated which produce deflections that can impair accuracy of the machine work done on the workpiece W.

Clamp 11 can be moved along T-slot 22 to any desired position on table 12, when bolt 38 is released so that nut 21 is loose in the slot. After the clamp is in the desired position, screw 38 is tightened by means of a wrench inserted into the head of the screw, access being had to the screw through opening 33 in the movable jaw above. Once the clamp is positioned, workpiece W can be aligned and positioned by engagement with the two work engaging surfaces 15a and 15b on the fixed jaw. These are preferably arranged to be parallel with and perpendicular to, respectively, the upper working surface 12a of table 12.

In operation, both clamps may be the same and of either type described, although it is preferred that at least one clamp 10 be used since this permits securing the clamp to base 12 and the final gripping of the workpiece W to be accomplished quickly by a single manual manipulation of hand screw 30. It will be apparent that more than two clamps may be employed, especially around a large workpiece. The description of only two clamps is merely illustrative of the operation of the clamping apparatus and not limitative upon the number of clamps 10 or 11 that may be employed to hold a workpiece of any particular size.

In the foregoing description, various directional terms such as "up" and "down," "horizontal" and "vertical," and the like have been employed, in accord with the illustration of base 12 as having a horizontally extending planar working surface 12a. However, it will be realized that these terms are used only for purposes of description of the illustrated embodiment and are not limitative upon the positioning or use of the invention.

From the foregoing description, it will be apparent that various changes in the detailed structure and arrangement of the parts constituting the present invention may occur to persons skilled in the art without departing from the spirit and scope of the present invention. Accordingly, it is to be understood that the foregoing description is to be considered as being illustrative of, rather than limitative upon, the invention as defined by the appended claims.

I claim:
1. A work holding clamp movably mounted on a base, comprising:
   a fixed jaw;
   a movable jaw rocking about a fulcrum carried by the fixed jaw to grip and hold a workpiece in cooperation with the fixed jaw;
   a lever pivotally mounted on the fixed jaw;
   securing means coupled to the base and to the lever and operable thereby to secure the fixed jaw to the base;
   and a jaw operating member connected to the movable jaw and engaging the lever to move both the jaw and the lever simultaneously to clamp a workpiece between the jaws and to secure the clamp to the base.
2. Work holding clamp according to claim 1 in which the clamp includes work aligning means on the fixed jaw.
3. Work holding clamp according to claim 2 in which the work aligning means provide a work engaging surface lying in a plane perpendicular to the base surface on which the clamp is mounted.
4. Work holding clamp according to claim 1 in which the jaw operating member is a screw threaded member having a handle thereon enabling the screw threaded member to be turned by hand.

References Cited

UNITED STATES PATENTS

| | | | |
|---|---|---|---|
| 732,761 | 7/1903 | Long | 269—89 |
| 1,788,652 | 1/1931 | Andrew | 269—89 X |
| 2,275,894 | 3/1942 | Ferguson | 269—146 X |
| 2,587,025 | 2/1952 | Beck | 269—146 |

FOREIGN PATENTS 241,243 10/1962 Australia.

LESTER F. SWINGLE, *Primary Examiner.*

JAMES F. McKEOWN, *Assistant Examiner.*

U.S. Cl. X.R.

269—97, 146